United States Patent [19]

Stuber et al.

[11] Patent Number: 5,059,011

[45] Date of Patent: * Oct. 22, 1991

[54] APPARATUS FOR THE RELATIVE INCREASE OF DEPTH SHARPNESS AND IMPROVEMENT OF RESOLVING POWER OF MAGNIFYING SYSTEMS, PARTICULARLY MICROSCOPES

[76] Inventors: Istvan Stuber, Nagyenyed u. 16, H-1123 Budapest; Geza Nagy, Jozseg Attila u. 135, H-1195 Budapest; Peter Petrak, Istenhegyi ut 20/c, H-1126 Budapest, all of Hungary

[*] Notice: The portion of the term of this patent subsequent to May 22, 2090 has been disclaimed.

[21] Appl. No.: 493,972

[22] Filed: Mar. 15, 1990

Related U.S. Application Data

[63] Continuation of Ser. No. 140,387, Jan. 4, 1988, Pat. No. 4,927,253.

[51] Int. Cl.$^5$ .................... G02B 21/06; G02B 21/14; G02B 21/20
[52] U.S. Cl. .................................. 350/514; 350/523; 350/526
[58] Field of Search ............... 350/508, 527, 534, 514, 350/515, 516, 526, 523

[56] References Cited

U.S. PATENT DOCUMENTS

| | | | |
|---|---|---|---|
| 4,624,882 | 11/1986 | Melisa et al. | 350/534 |
| 4,679,914 | 7/1987 | Rosenberg | 350/534 |
| 4,806,004 | 2/1989 | Wayland | 350/527 |
| 4,884,880 | 12/1989 | Lichtman et al. | 350/527 |
| 4,884,881 | 12/1989 | Lichtman et al. | 350/527 |
| 4,927,253 | 5/1990 | Stuber et al. | 350/508 |
| 4,927,254 | 5/1990 | Kino et al. | 350/508 |

FOREIGN PATENT DOCUMENTS

| | | |
|---|---|---|
| 212048 | 11/1960 | Austria . |
| 1111845 | 7/1961 | Fed. Rep. of Germany . |
| 1126641 | 3/1962 | Fed. Rep. of Germany . |
| 1803964 | 6/1969 | Fed. Rep. of Germany . |
| 2360197 | 6/1975 | Fed. Rep. of Germany . |
| 2731791 | 1/1979 | Fed. Rep. of Germany . |
| 3200038 | 7/1983 | Fed. Rep. of Germany . |

OTHER PUBLICATIONS

H. Illig et al., "ABC Glas", VEB Deutscher Verlag fur Grundstoffindustrie (Leipzig), 1983, p. 249.

O. Neumuller, "Rompps Chemie-Lexikon", vol. 2, Franckh'sche Verlagshandlung (Stuttgart), 1981, p. 1487.

*Primary Examiner*—Bruce Y. Arnold
*Assistant Examiner*—Martin Lerner

[57] ABSTRACT

The invention relates to an apparatus for increasing depth sharpness and improving the resolving power of magnifying systems, particularly microscopes. An image-forming layer is inserted between the primary and secondary magnifiers of a composite magnifying system, in the optical path, after the object, in the image plane of the primary magnifier. The image-forming layer is comprised of independent particles dispersed in a medium, the index of refraction of which differs from that of said particles. The image-forming layer is disposed in the image plane, whereby the images coincide with the object plane of the secondary magnifier.

12 Claims, 9 Drawing Sheets

APPARATUS FOR THE RELATIVE INCREASE OF DEPTH SHARPNESS AND IMPROVEMENT OF RESOLVING POWER OF MAGNIFYING SYSTEMS, PARTICULARLY MICROSCOPES

This is a continuation of application Ser. No. 07/140,387, filed Jan. 4, 1988 entitled Apparatus For The Relative Increase Of Depth Sharpness And Improvement Of Resolving Power Of Magnifying Systems, Particularly Microscopes now U.S. Patent Ser. No. 4,927,253.

BACKGROUND OF THE INVENTION

The invention relates to apparatus increasing the relative depth sharpness and improving the resolving power of magnifying systems, particularly microscopes.

In technical practice and in fields such as medicine and biology, increasing the depth sharpness and improving the resolving power of magnifying systems, particularly of microscopes, are still tasks to be solved.

For the adjustment of the image plane, or when imaging in a ratio of 1:1, at most, matte glass sheets used to be applied. In these cases, the matte glass sheets were fixed, as displacement or movement thereof does not result in a considerable improvement of image quality.

Through experiments, we found that when small objects are imaged with a considerable magnification (e.g., as in microscopic systems) such an effect already appears. In this type of magnifying, among others, smallness of depth sharpness represents the limit of detecting capabilities. By using matte glass sheets and moving them in the image plane, an image with a better depth of sharpness and richer in details can be obtained. Both depth sharpness and grade of magnifying may be improved in this manner, and as a consequence, applicability of presently used microscopes can be increased.

An object of this invention is to provide apparatus which will cause the image produced by the objective of an optical of a physical composite magnifying system to be richer in details and have the largest depth sharpness possible. It is a well known process to use matte glass sheets for adjusting the image plane, mainly in the case of reduced imaging, or at best with imaging with a ratio of 1:1. In this case, displacement of the matte glass sheet does not result in a considerable improvement of image quality.

SUMMARY OF THE INVENTION

The invention is based on the recognition that if small objects are imaged with a considerable magnification, e.g., in microscopic systems, the aforementioned displacement results in a special effect. In this case detection is restricted by, among other things, the small depth of sharpness. By moving the matte glass sheet in the image plane, both depth sharpness and resolving power can be increased and applicability of the microscopes used up to now can also be increased. The image thus obtained is far richer in details, and significant depth sharpness can be achieved.

In accordance with the invention, this is achieved by disposing an image-forming layer in the image plane of the primary magnifier, between the primary and secondary magnifier of a composite magnifying system, and after the object in respect of the optical path. The layer is formed by independent particles distributed in a medium having a different index of refraction. The image-forming layer can be moved in the image plane.

The primary and secondary magnifiers can be simple or composite magnifiers, i.e., the primary magnifier may consist of a primary objective and primary ocular (or projector), and the secondary magnifier may comprise a secondary objective and a secondary ocular (or projector).

Movement of the image-forming layer can take place along any regular or irregular path. Moving along a circular path seems to be the most expedient.

BRIEF DESCRIPTION OF THE DRAWINGS

The invention will now be described by means of a preferred embodiment serving as an example, by the aid of the accompanying drawings in which.

DETAILED DESCRIPTION OF THE PREFERRED EMBODIMENTS

Figure 1:
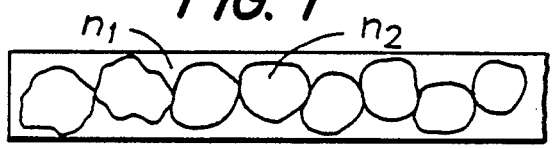
FIG. 1 is a cross-sectional view of an image-forming layer with particles having a different index of refraction dispersed within the layer.

In the simplest case, the image-forming layer can be a matte glass sheet. Other materials which can be used as image-forming layers include: solid particles dispersed in a liquid (i.e., suspensions); liquid particles dispersed in a liquid (i.e., emulsions); gas bubbles dispersed in a liquid (i.e., foams); liquid drops dispersed in a gas (i.e., aerosols); and colloidal solutions. Furthermore, matte surfaces of transparent solid materials having a different index of refraction (see FIG. I) than that of the medium in which it is placed (theoretically, vacuum is also a "medium with a different index of refraction") can also be used. Where primary and secondary optical systems are arranged on the same side of the image-forming layer, the matte surface of an opaque material may serve as the image-forming layer, using, for example, fiber optics, gas bubbles dispersed in a transparent solid material, solid grains, and liquid or solid particles dispersed in a gas (e.g., smoke).

These image-forming layers are kept in motion. This movement can take place, as previously mentioned, on any regular or irregular path. In addition to said movements taking place on regular or irregular paths, or even simultaneously therewith, other movement is also possible. For example, the layers may move in a rotary motion around their own axis of rotation, or in an alternating motion with an irregularly changing velocity along a straight path, running parallel with the optical axis (axes) of the apparatus enclosing an angle therewith.

Within the image-forming layer, the particles dispersed in the medium, which have an index of refraction different from that of the medium, do not move, or move only an insignificant amount with respect to the medium. However, in some cases, a considerable material flow can be observed within the image-forming layer. The particles dispersed in the medium, having an index of refraction different from that of the medium, may even be capable of luminescence.

The independent particles taking part in building-up the image-forming layer are able to produce luminescence, if their index of refraction does not differ from that of the medium in which are dispersed.

Practically any illuminating system, including those in which the wavelength is different from the wavelength of visible light, can be used for producing the image of the object. For example, a source emitting electromagnetic radiation with a wavelength corresponding to the wavelength of visible light, or even an illuminating system emitting electron radiation, may be used.

The application of any illuminating system of desired number or arrangement, and actuated in any desired combination is permitted for illuminating the object at a desired angle. Furthermore, these can be operated in a desired combination, and simultaneously.

The preferred embodiment of the invention is provided with a stroboscopic illuminating system. According to the invention, the means for illuminating the object to be tested can be varied within wide limits: illumination can take place through a layer consisting of particles dispersed in a medium having an index of refraction different from that of any image-forming layer; this layer is arranged in the path of the beam in the section between the condenser and the object. The layer may move on a regular or irregular path.

Where the image-forming layer is made of a opaque material, illuminating is realized by means of the beam reflected from the matte surface. The matte surface, which is either stationary or moving, is arranged in the path of the beam, between the condenser and the object. The illuminating system is arranged on the same side as the matte surface of the object.

In another preferred embodiment of the invention, illuminating is realized (using any of the aforementioned image-forming layers) through the layer consisting of particles dispersed in a medium with a different index of refraction. The layer is disposed in the path of the beam, in the section between the source of light and radiation, and the condenser. The layer can be stationary or moving.

If a matte glass sheet is used as an image-forming layer, illuminating is realized through said matte glass sheet. The matte glass sheet is arranged in the path of the beam, between the source of light or radiation, and the condenser. The glass sheet may move either in a regular or irregular manner, but preferably moves in a regular circular path. Simultaneously with this motion, the matte glass sheet may also move in a rotary motion around its own axis of rotation, with any desired velocity.

In yet another embodiment of the invention, illuminating is realized by reflecting a beam from the matte surface of an image-forming layer of opaque material, wherein the matte surface is disposed in the path of the light or radiation, in the section between the source of light or radiation, and the condenser. It may be either stationary or in motion.

Figure 3:
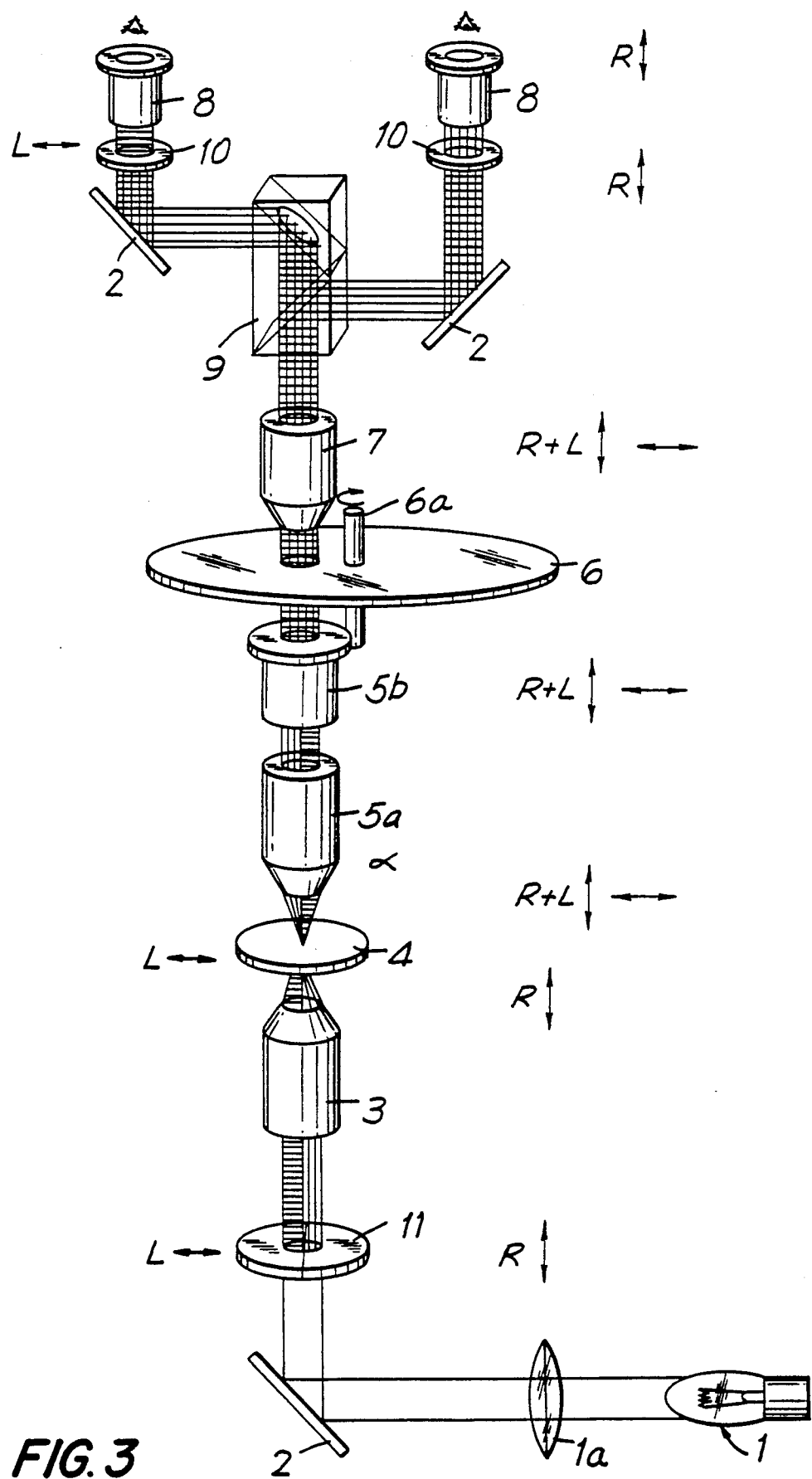
FIGS. 3-4 are schematic diagrams of microscopes constructed in accordance with the present invention having a half-filter.
Figure 4:
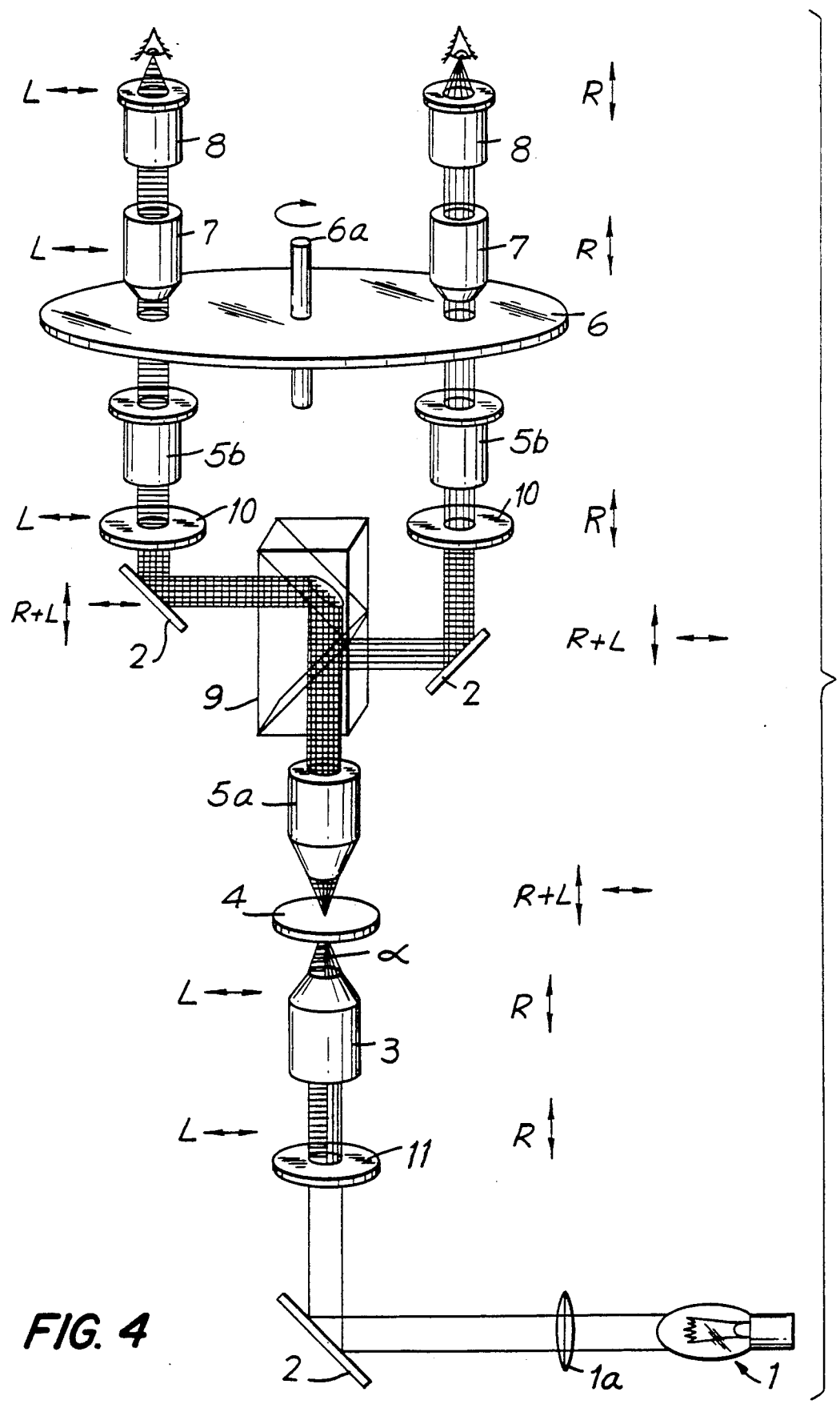

In the preferred embodiment of the invention, the light path is arranged in a closed casing which surrounds it either partially or completely. According to the invention, any optical elements, examples of which are shown in FIGS. 3 and 4, may be inserted into the path of the beam. The optical elements may be disposed at any location along the path of the beam, in any number, combination, or geometric arrangement. These optical elements may include mirrors 9, lenses, prisms, plane-parallel plates, fiber optics, filters 10 and 11, and polarization, phase, and interference means.

Figure 5:
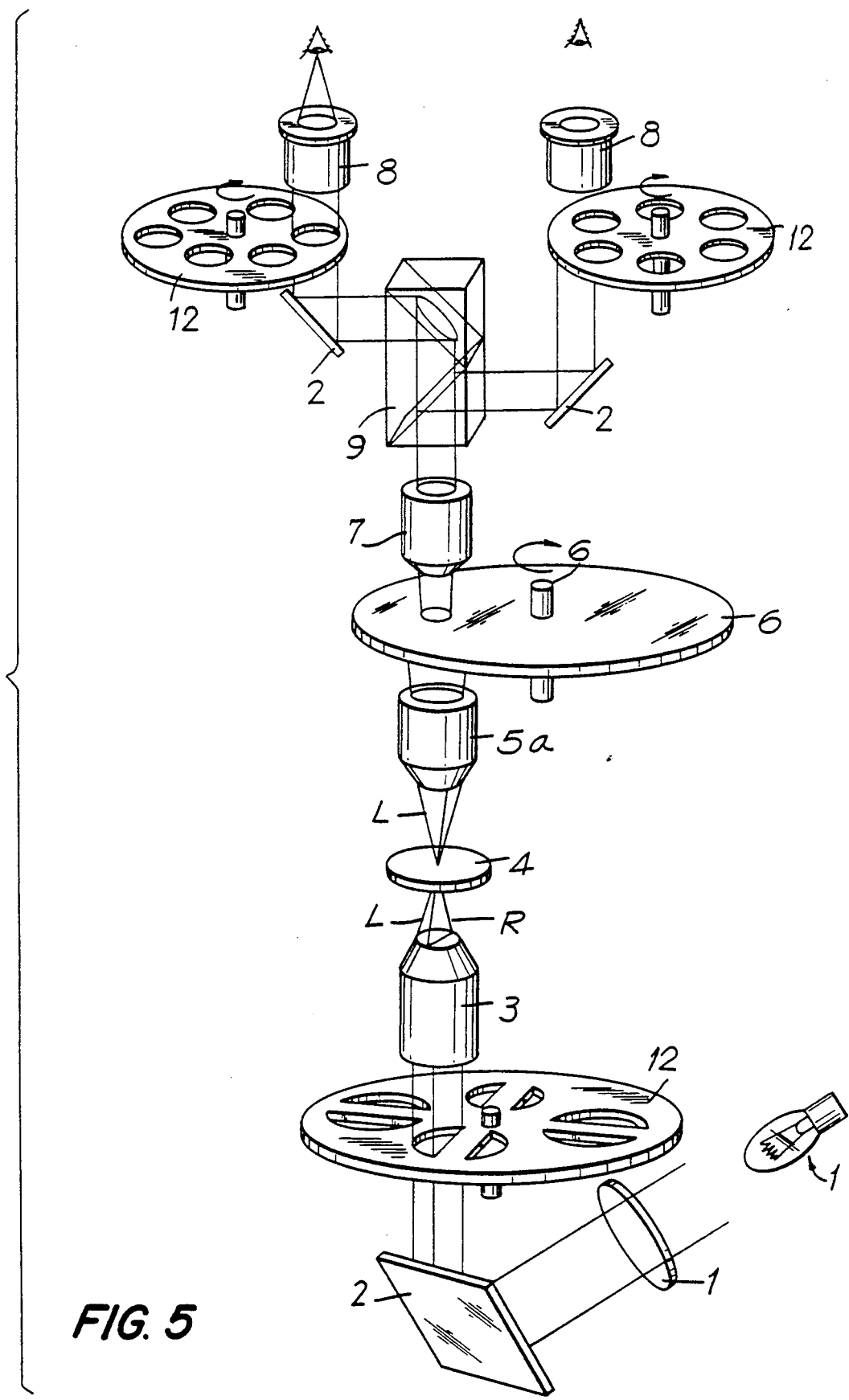
FIG. 5 is a schematic diagram of a microscope of the present invention having stroboscopes.

In other embodiments, as shown in FIG. 5, stroboscopes 12 may be arranged in any desired section of the path of the beam, in any desired quantity and arrangement.

Figure 6:
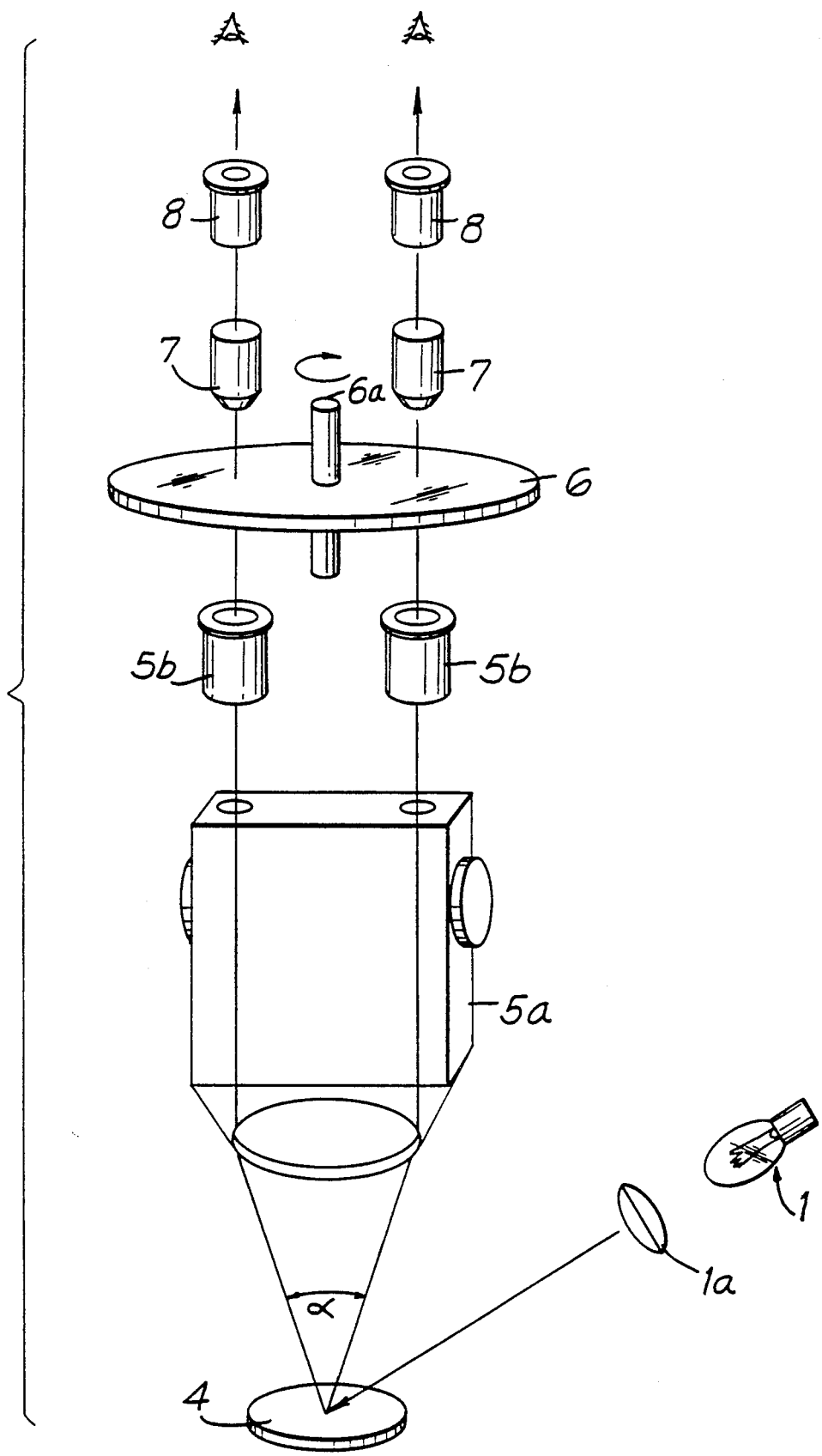
FIGS. 6-8 are schematic diagrams of alternative embodiments of microscopes of the present invention having two primary and two secondary magnifiers.
Figure 7:
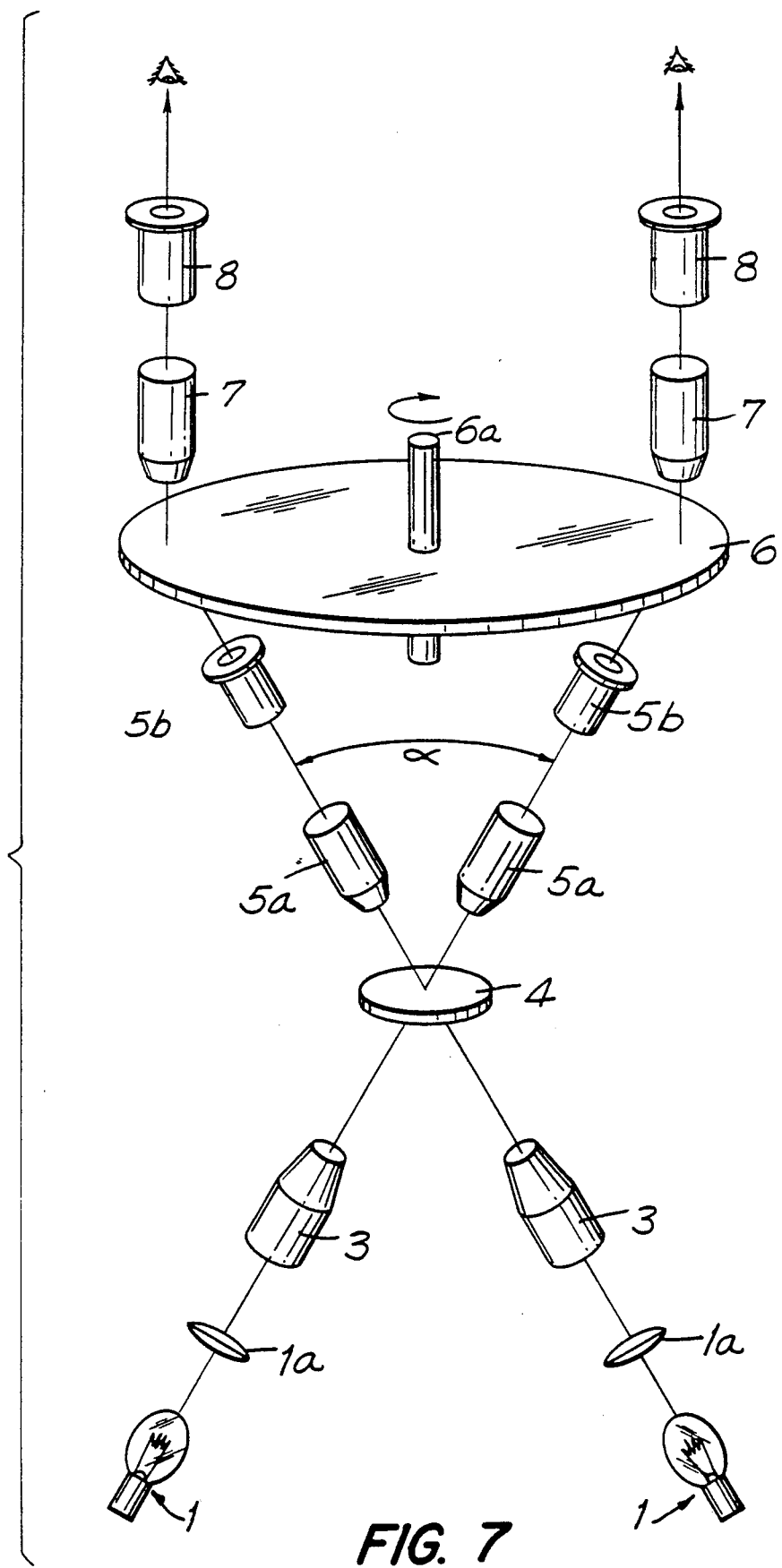
Figure 8:
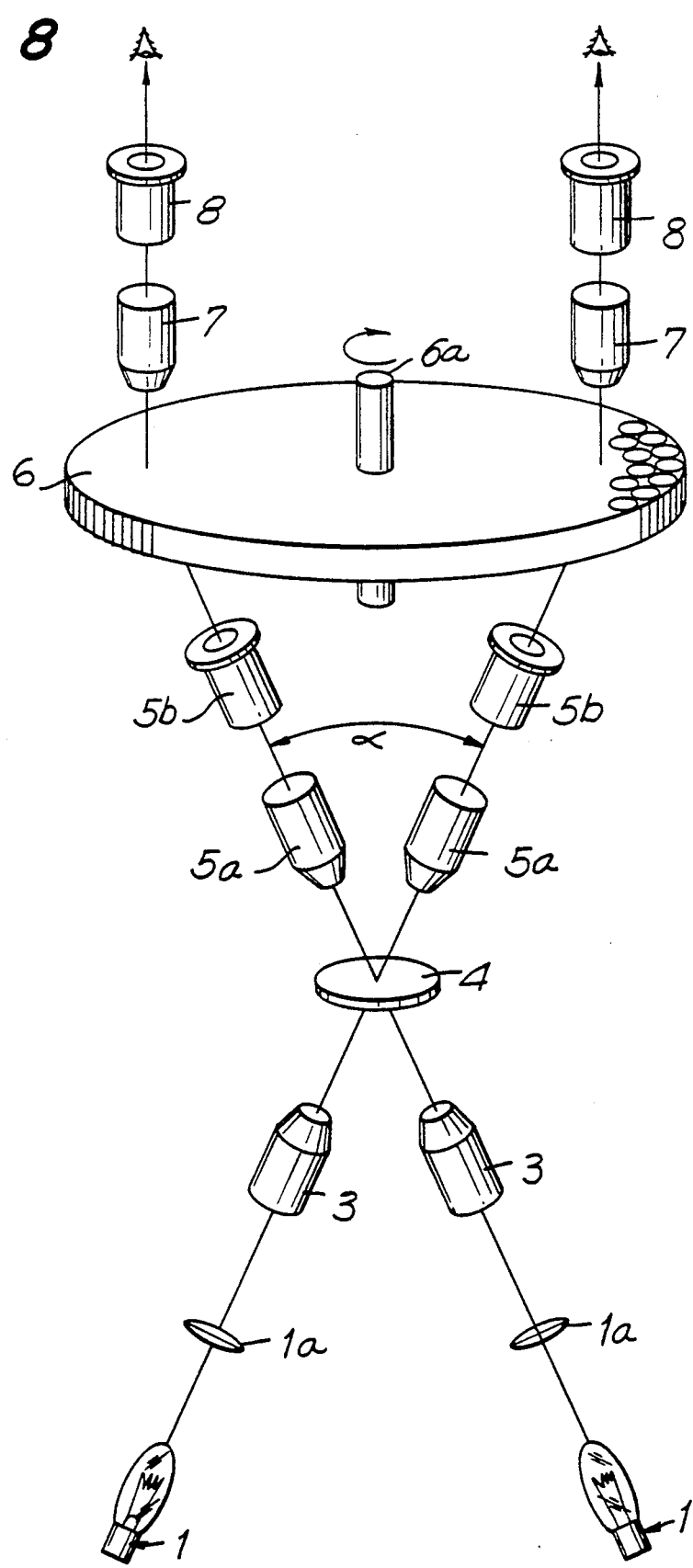

In an illustrative embodiment of the invention, the optical system has two primary magnifiers for producing the spatial image of the object, each producing an image of the object on the image-forming surface at different angles. Two secondary magnifiers project said images isolated into the two eyes of the viewer. Three such embodiments are shown in FIGS. 6-8. The image-forming layer 6 of FIG. 8 also shows an example of a fiber optic image-forming layer.

Figure 9:
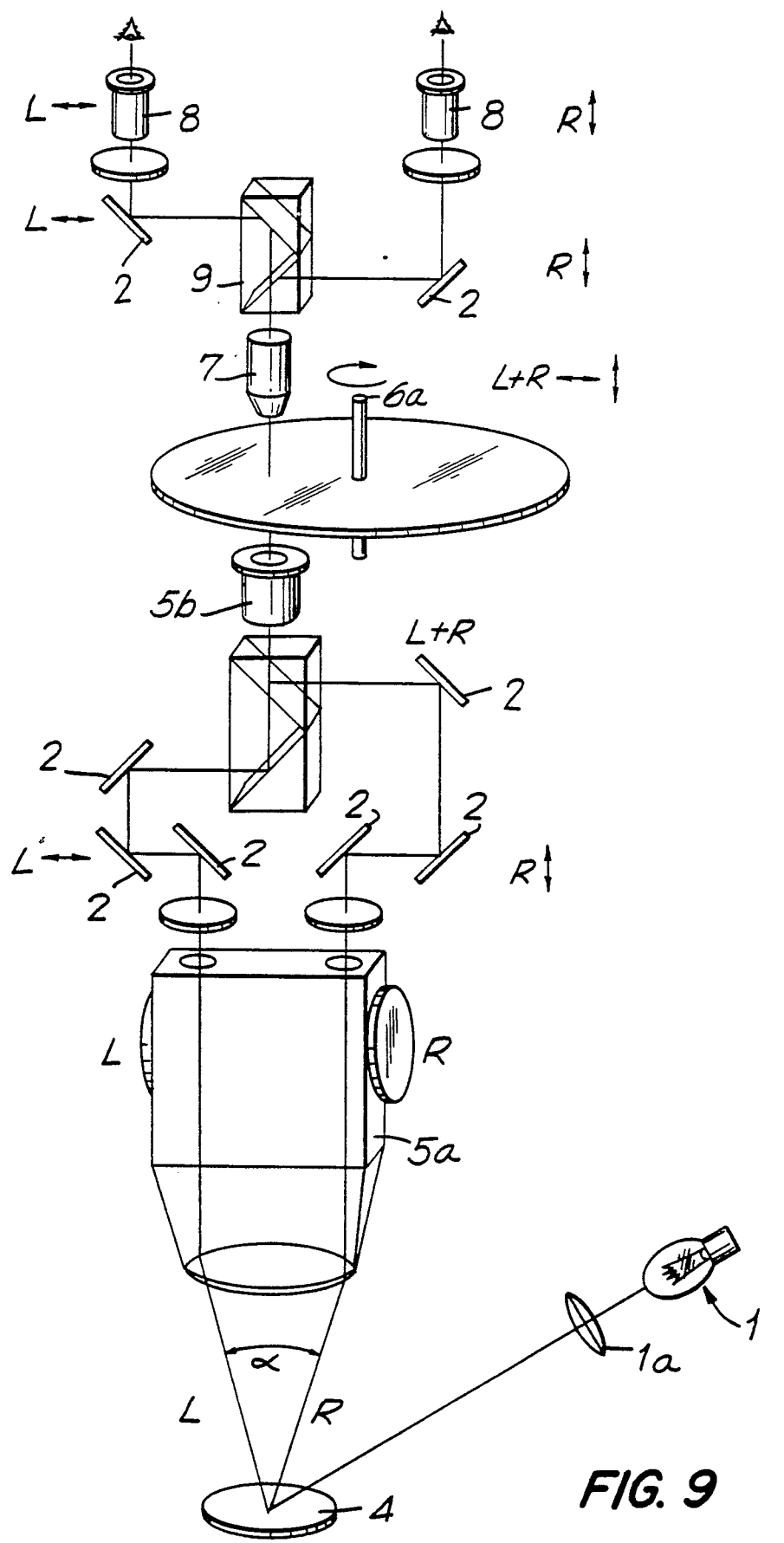
FIG. 9 is an alternative embodiment of the microscope of FIG. 6.

In yet another preferred embodiment, shown in FIG. 9, the built-in objectives (e.g., primary, secondary, etc.) perform a predetermined alternating movement. Each objective moves separately, undirectionally with the optical axis and in compliance therewith, with regular or irregular acceleration and velocity.

Figure 10:
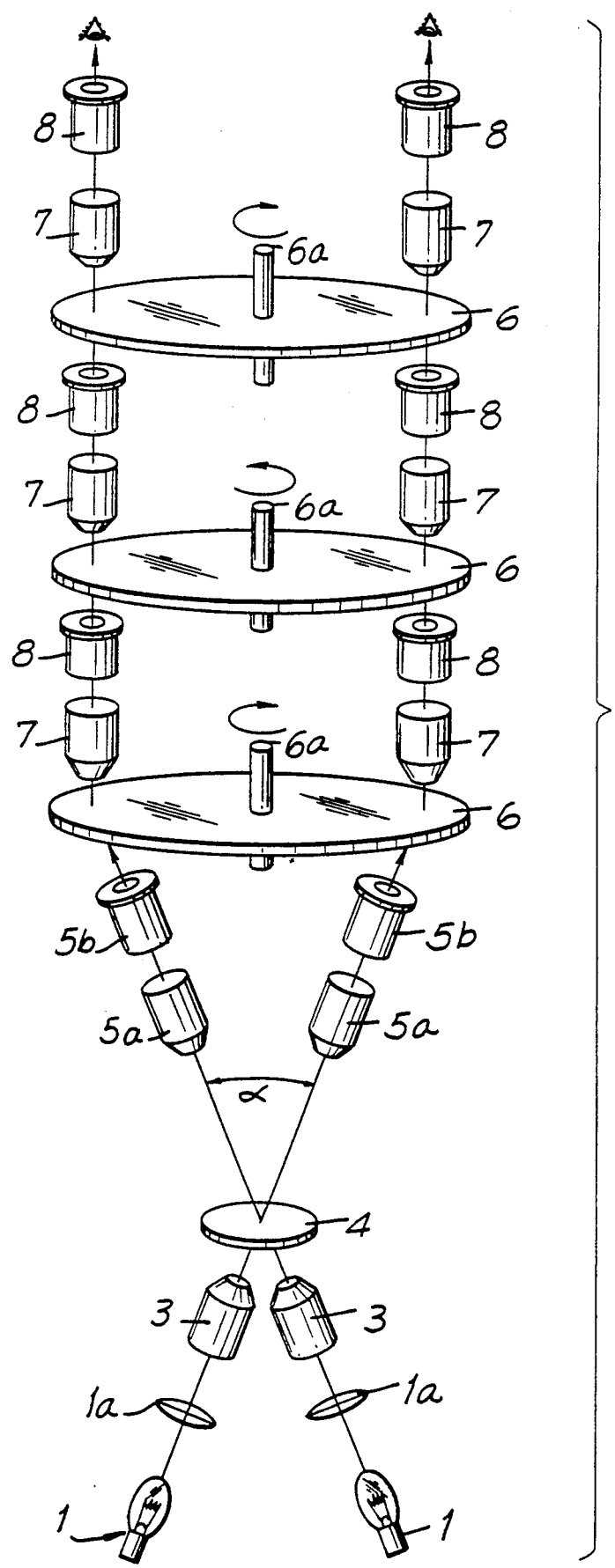
FIG. 10 is an alternative embodiment of the microscope of FIG. 7 having additional image-forming layers.

According to a further preferred embodiment of the invention, shown in FIG. 10, more than two magnifiers and image-forming layers are arranged, in the path of the beam, along the optical axis. The image produced by the secondary magnifier is projected to another image-forming layer and enlarged by a third (tertiary) magnifier. This process is repeated on further image-forming layers. When using a plurality of image-forming layers, at least one image-forming layer is put into motion; the other image-forming layers are either stationary or in motion, in any desired combination.

In all of the preferred embodiments of the invention, every optical and mechanical structural element of the apparatus is arranged so as to enable movement in relation to each other along any desired regular or irregular path with any desired velocity, in any desired combination. The object to be viewed is arranged so that it can be moved along a desired regular or irregular path, with a desired velocity.

In the preferred embodiments of the invention, a photo-camera, video camera, or any other radiation sensor may be disposed in any section of the path of the beam. Said apparatuses may be disposed along any desired path.

In an illustrative embodiment of the invention, the image-forming layer is formed by the matte surfaces of two transparent solid materials. The matte surfaces of the two transparent solid materials are arranged on one another and facing each other. The matte surfaces are stationary or move in relation to each other on any regular or irregular path, and between the two surfaces, but do not prevent the motion of the image-forming layer. A material is to be found with an index of refraction being different from that of the particles of the matte surface. This material can be either a liquid, a gas, vacuum, or solid.

As previously mentioned, a variety of image-forming layers can be used. However, for the sake of simplicity, we refer to a matte glass sheet only.

The granular surface of the matte glass sheet moves in the image plane of the first (primary) magnifying stage of the composite magnifying system. The beam coming from the object is projected by a simple or composite magnifier (primary magnifier) onto the granular surface of the matte glass sheet, thus producing the image in the plane of the particles (i.e., the plane of the image of the primary magnifier coincides with the granular surface of the matte glass sheet).

This image is enlarged by another simple or composite magnifier (secondary magnifier). The object-plane of the secondary magnifier coincides with the granular layer of the matte glass sheet. As previously mentioned, in course of forming the image, the matte glass sheet is moving along some regular or irregular path. Until now, no method was known for allowing the matte glass sheet to move in the image plane for obtaining an image richer in details and for increasing depth sharpness.

Figure 2:
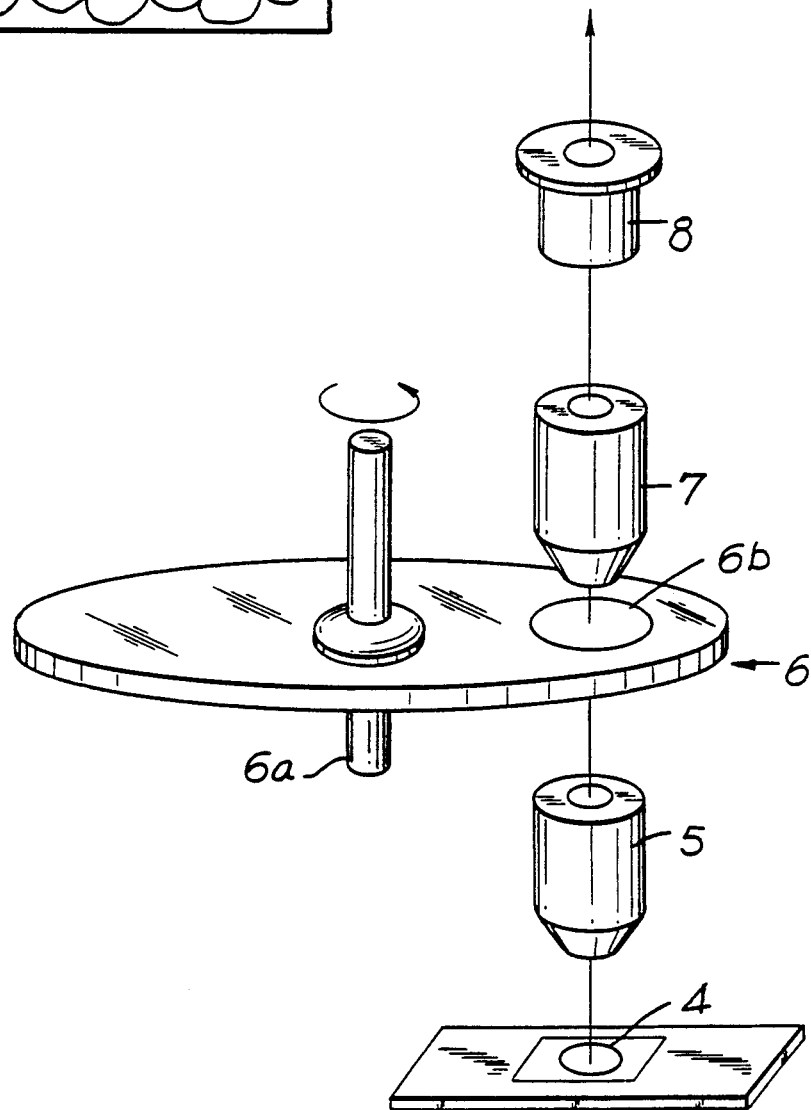
FIG. 2 is a schematic diagram of a microscope constructed in accordance with the principles of this invention.

Referring now to FIG. 2, the illuminating system includes a lamp 1, a collecting lens 1a and a mirror 2. In the path of the beam projected by the mirror 2, shown in the figure vertically upwards (in the so-called optical axis), elements are arranged one above another: a condenser 3, an object to be viewed 4 (generally a microscopic section), a primary magnifier 5, a rotatable matte glass sheet 6, a secondary objective 7 and an ocular 8. Matte glass sheet 6 can be rotated around the axis of rotation 6a, said axis arranged excentrically in relation to the optical axis. The image 6b of object 4 is located at the point of intersection of the matte glass sheet 6 and the optical axis.

The illuminating beam is projected by the illuminating system, with the aid of a condenser 3, through object 4 and imaged by primary magnifier 5 onto the upper surface of the matte glass sheet 6. magnifier comprised of secondary objective 7 and secondary ocular 8. A microscopic photo-apparatus can be inserted in place of the secondary ocular 8.

The composite microscope system, which includes a matte glass sheet in accordance with the invention, is formed by two microscopes placed one above the other. The object points lying within the depth sharpness of the primary objective of the first microscope are imaged in one plane on the surface of the matte glass sheet, while the image thus obtained is enlarged by the secondary magnifier. As a consequence, the image having been produced by the secondary magnifier keeps the depth sharpness of the primary magnifier. The movement of the matte glass sheet causes the quality of the image appearing on the surface thereof to be improved. Accordingly, it can be further enlarged by the secondary magnifier. Thus, the proportion of magnifying and depth sharpness will be shifted so that a given magnification is accompanied by a larger depth sharpness. This means that depth sharpness of the optical system relatively increases. In such a manner it becomes possible to detect microscopic configurations lying in deeper and thicker layers, than previously possible. The possibility of simultaneously examining several layers of microscopic objects is improved. The resolving power of the magnifying system will also be improved.

In accordance with the invention, an apparatus suitable to create the spatial image of an object can also be provided. In this case, two optical systems are simultaneously applied on the surface of the image-forming layer. By means of two primary magnifiers, two images are produced, each at a different angle. These images are viewed, each with a separate secondary magnifier. The image produced by each secondary magnifier is projected into a different eye of the viewer.

The invention is not to be construed as restricted to the embodiments described above, which were given as examples only. Other embodiments are possible without leaving the scope of the invention. For example, any other electromagnetic radiation with a wavelength different from the wavelength of visible light can be applied to produce the object's image. Primary and secondary magnifiers can also be arranged on the same or opposite sides of the plane of the image-forming layer. When arranged on the same side, the path of the beam is incident with respect to the image-forming layer, and transmitted when on opposite sides. In the case of incident beam travel, matte surfaces of opaque materials can also comprise the image-forming layer.

It is possible to arrange more than two magnifiers, as well as two or more image-forming layers, in the path of the beam along the optical axis. In such a case, the image having been produced by the secondary magnifier is projected onto a further image-forming layer, which, in turn, is further enlarged by a third (tertiary) magnifier. Based on this principle, several magnifying stages can be realized.

What is claimed is:

1. Apparatus for increasing the depth sharpness and resolving power of magnifying systems, comprising:
   a first primary magnifier;
   a first secondary magnifier;
   an illuminating system for producing the image of an object to be viewed, wherein said illuminating system emits electromagnetic radiation with a wavelength corresponding to that of visible light;
   an image-forming layer disposed in the optical path between the first primary magnifier and the first secondary magnifier in the image plane of the first primary magnifier and in the object plane of the firs secondary magnifier, said layer being formed by independent particles dispersed in a medium having an index of refraction different from that of said particles, said image-forming layer being displaceable in said image plane;
   a second primary magnifier, where said first and second primary magnifiers produce, at different angles on said image-forming layer, first and second images of the object to be viewed; and
   a second secondary magnifier, where said first secondary magnifier projects said first image for viewing by a first eye of a viewer, and said second secondary magnifier projects said second image for viewing by a second eye of said viewer.

2. Apparatus as claimed in claim 1 wherein said illuminating system is a stroboscopic illuminating system.

3. Apparatus as claimed in claim 1, further comprising:
   at least one additional image-forming layer disposed such that the images produced by said first and second secondary magnifiers are projected to said additional image-forming layer; and
   a tertiary magnifier which magnifies the images formed on said additional image-forming layer.

4. The apparatus of claim 1, 2, and 3, wherein the image-forming layer is a matte surface of an opaque material and both the first and second primary magnifiers and first and second secondary magnifiers are arranged on the side of the image-forming layer corresponding to the matte surface.

5. Apparatus as claimed in claim 4 wherein the object to be viewed is illuminated by a beam reflected from the matte surface of the image-forming layer made of an opaque material, said matte surface being disposed between a condenser and the object, in the optical path of the beam the illuminating system being arranged on the same side of the image-forming layer as the object and the matte surface.

6. Apparatus as claimed in any of claims 1, 2, and 3, wherein the image-forming layer further comprises fiber optics.

7. Apparatus as claimed in claim 3, wherein at least one image-forming layer is capable of motion.

8. Apparatus as claimed in claim 1, wherein the object is illuminated with a beam reflected from a matte surface of the image-forming layer made of an opaque material said matte surface being disposed in the optical path of the beam, between the illuminating system and a condenser.

9. Apparatus as claimed in claim 1, further comprising at least one stroboscope disposed in the path of the beam in a predetermined arrangement.

10. Apparatus as claimed in claim 1, further comprising a photo-camera disposed in the path of the beam, said photo-camera being movable along a predetermined path.

11. Apparatus for increasing the depth sharpness and resolving power of magnifying systems, comprising:
   a first primary magnifier;
   a first secondary magnifier;
   an illuminating system for producing the image of an object to be viewed, wherein said illuminating system emits electromagnetic radiation with a wavelength corresponding to that of visible light;
   an image-forming layer disposed in the optical path between the first primary magnifier and the first secondary magnifier in the image plane of the first primary magnifier and in the object pane of the first secondary magnifier, wherein said layer is formed of independent particles capable of luminescence and are dispersed in a medium having the same index of refraction as that of said particles, said image-forming layer being displaceable in said image plane;
   a second primary magnifier, where said first and second primary magnifiers produce, at different angles on said image-forming layer, first and second images of the object to be viewed; and
   a second secondary magnifier, where said first secondary magnifier projects said first image for viewing by a first eye of a viewer, and said second secondary magnifier projects said second image for viewing by a second eye of said viewer.

12. Apparatus for increasing the depth sharpness and resolving power of magnifying systems, comprising:
   a first primary magnifier;
   a first secondary magnifier;
   an illuminating system for producing the image of an object to be viewed, wherein said illuminating system emits electromagnetic radiation with a wavelength corresponding to that of visible light;
   an image-forming layer disposed in the optical path between the first primary magnifier and the first secondary magnifier in the image plane of the first primary magnifier and in the object plane of the first secondary magnifier, wherein said layer is formed by matte surfaces of two transparent solid materials arranged on one another and facing each other, and a third material with an index of refraction differing from that of the particles of the matte surface disposed between the two transparent solid materials, said image-forming layer being displaceable in said image plane;
   a second primary magnifier, where said first and second primary magnifiers produce, at different angles on said image-forming layer, first and second images of the object to be viewed; and
   a second secondary magnifier, where said first secondary magnifier projects said first image for viewing by a first eye of a viewer, and said second secondary magnifier projects said second image for viewing by a second eye of said viewer.

* * * * *